United States Patent
Mele

[15] 3,661,406
[45] May 9, 1972

[54] RETENTION MEANS

[72] Inventor: Joseph J. Mele, 188 Warner Road, Huntington, N.Y. 11743

[22] Filed: Oct. 21, 1969

[21] Appl. No.: 868,120

[52] U.S. Cl..................................287/189.36F, 151/41.73
[51] Int. Cl..........................................................F16b 5/02
[58] Field of Search................................151/41.73; 85/21; 287/189.36 F

[56] References Cited

UNITED STATES PATENTS

| | | | |
|---|---|---|---|
| 3,530,921 | 9/1970 | Ernest | 151/41.73 |
| 1,914,507 | 6/1933 | Howard | 85/21 |
| 1,978,329 | 10/1934 | Rosenberg | 85/21 |
| 2,028,528 | 1/1936 | Sipe | 85/21 |
| 2,058,520 | 10/1936 | Sipe | 151/41.73 |
| 2,196,144 | 4/1940 | Eckler | 85/21 |
| 3,349,649 | 10/1967 | Mele | 151/41.73 |
| 3,456,972 | 7/1969 | Drotan | 151/41.73 |

FOREIGN PATENTS OR APPLICATIONS

| | | | |
|---|---|---|---|
| 789,875 | 8/1935 | France | 85/21 |
| 319,495 | 4/1957 | Switzerland | 151/41.73 |

*Primary Examiner*—Edward C. Allen
*Attorney*—Arthur T. Groeninger

[57] ABSTRACT

A shaft is provided with a plurality of peripheral lands which are press fitted into an aperture formed in a plate, housing or other structure. The lands are intersected by inclined surfaces which together with the surface of the shaft and aperture define spaced regions adjacent to the lands. Said press fitting subjects the material of the plate, housing or other structure to stress which urges said material to flow into said spaced regions, thereby relieving said stress and interfering with relative movement between the shaft and the plate, housing or other structure accommodating the shaft.

1 Claim, 7 Drawing Figures

PATENTED MAY 9 1972
3,661,406
SHEET 1 OF 2
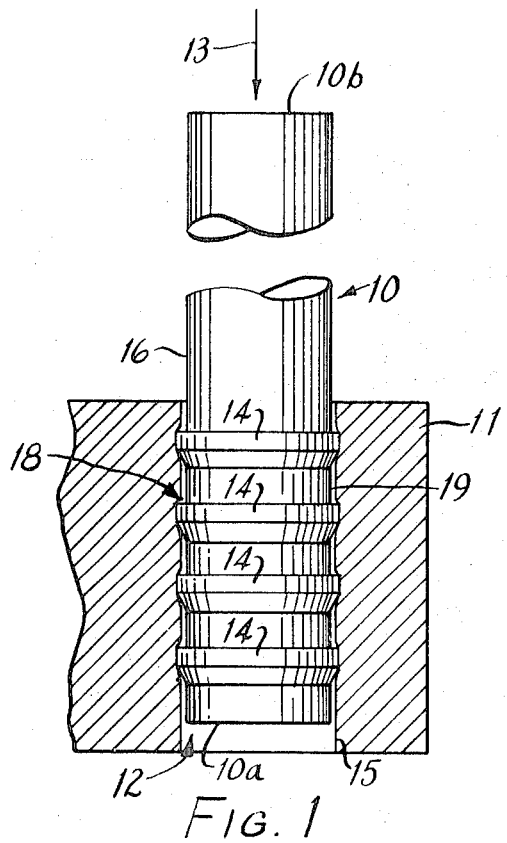
FIG. 1
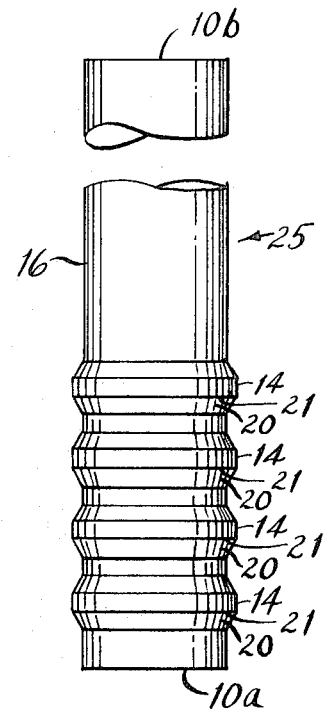
FIG. 3
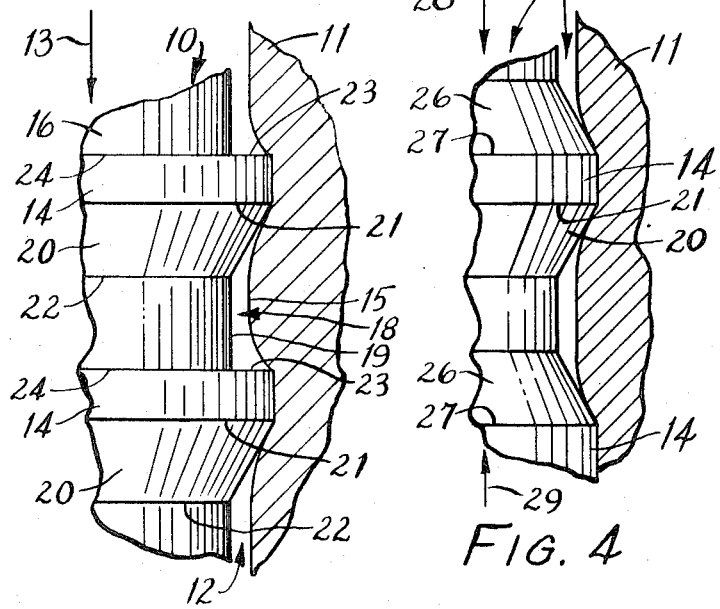
FIG. 2
FIG. 4
INVENTOR
JOSEPH J. MELE
BY Charles Marks INVENTOR.
JOSEPH J. MELE
BY
Charles Marks

3,661,406

RETENTION MEANS

BACKGROUND OF THE INVENTION

1. Field of the Invention

This invention relates generally to means for retaining a shaft in a plate, housing or other structure and is particularly concerned with the retention therein of a stud, pin, rivet, bolt or other longitudinally extending member. The invention is also concerned with minimizing the likelihood of dislocation and rupture of such members and of the plate, housing or other structure wherein said stud, pin, rivet, bolt or other longitudinally extending member is accommodated.

2. Description of the Prior Art

Heretofore, it has been customary to press fit cylindrical members such as studs, pins and the like into suitable apertures formed in metal plates, housings and other structures, the said cylindrical members then being frictionally retained in the apertures. However, this frictional retention may be overcome in a variety of ways so as to dislodge or disengage said members. This may result not only from vibrations and axial and lateral pressures exerted upon the cylindrical members during their operative use but also as a consequence of the tendency of the surrounding material to relieve the pressure between the cylindrical members and the surfaces of the apertures accommodating said cylindrical members.

Where conventional cylindrical members such as bolts and other fasteners have been accommodated in apertures provided in plates and other structures, it has also been found that by reason of the clearance between the fasteners and the apertures, movement therebetween is permitted. Such movement is particularly undesirable where it arises as a result of vibration which may produce fatigue stresses and consequent rupture of the fasteners or structures wherein they are accommodated.

Moreover, where said structures are subjected to stress prior to their accommodation of conventional press fitted fasteners and the like, the additional stresses arising by reason of the press fitting of said fasteners and the like may entail rupture of said structures.

Where clearance is provided, as in the examples noted above, between the apertures and the cylindrical members received therein, said clearance permits moisture and contaminants to enter the apertures and to corrode them together with the cylindrical members, thereby rendering them difficult to withdraw when desired.

It is an object of the present invention to provide improved means for effecting the retention of cylindrical members such as studs, pins and the like in plates, housings and other structures.

Another object of the invention is to provide improved means for effecting the retention of longitudinally extending members in plates, housings and other structures.

Another object of the invention is to provide such retention means which utilizes both frictional resistance and mechanical obstruction by the material of the plates, housings and other structures to minimize the likelihood of dislodgement, disengagement or withdrawal of the said cylindrical and longitudinally extending members from said plates, housings and other structures.

Another object of the invention is to provide such retention means whereby stresses occasioned by the engagement thereof in said plates, housings and other structures are relieved to a great extent.

Another object of the invention is to provide such retention means which can tolerate great variations in alignment or dimensions of the aperture intended to accommodate said retention means and which tends to seal out moisture and contaminants from said aperture.

Another object of the invention is to provide such retention means which resists corrosion more readily than conventional retention means and which can be more easily withdrawn and replaced after undergoing corrosion.

Another object of the invention is to provide improved means for fastening a plurality of plates and other structures.

Another object of the invention is to provide improved fastening means whereby fatigue stresses and rupture in such fastening means and plates and other structures will be minimized.

Another object of the invention is to provide such fastening means which will have improved resistance to shear stress.

Still another object of the invention is to provide such fastening means whereby there is a minimum of play between the fastening means and the surfaces of the apertures in which said fastening means are accommodated.

A yet further object of the invention is to provide fastening means which will resist disengagement, dislocation and withdrawal from such apertures.

Other and further objects and advantages of the present invention will become apparent from the following description when read in conjunction with the accompanying drawings.

SUMMARY OF THE INVENTION

In the present invention, a member, such as a metal plate or housing, is provided with an aperture into which is press fitted a shaft such as that embodied in a stud. The shaft is provided with a plurality of peripheral ridges or lands, the outermost surfaces of which are substantially parallel to the surface of the aperture. On at least one leading side of each said land, an inclined surface intersects the land and the periphery of the shaft thereby forming a depressed region adjacent to the leading side of each land. When the shaft is press fitted into the aperture, it is frictionally engaged with the lands and at the same time they urge the material of the aperture into the depressed regions. Here, said material resists axial and lateral movement of the shaft with respect to the aperture and also seals it against the entry of moisture and contaminants which might otherwise result in corrosion. Moreover, if corrosion does occur, it will tend to cause adherence only between the lands and the surface of the aperture so that in order to withdraw the shaft for purposes of replacement and the like, it is only necessary to overcome this limited adherence.

In a modified form of the invention, inclined surfaces terminating at the outermost surfaces of the lands facilitate insertion of the stud into the aperture from opposite directions.

On another form of the invention, such as a bolt employing lands of the above described character, they are disposed within an aperture extending through mating plates or other members, their mating faces being disposed intermediately of two of said lands. The lands are disposed in contact with the aperture, thereby eliminating or minimizing play between the bolt and the aperture and thus reducing vibration which might otherwise be present in the plates or other members. Moreover, upon being subjected to shear stress, such as may arise from said vibrations, the bolt will tend to incline so as to expose said shear stress to a shear area greater than the minimum cross-sectional area of the bolt between said lands.

Furthermore, where the bolt is press fitted into said aperture so as to urge the material thereof into the depressed regions in the manner previously mentioned, said material will tend to anchor the bolt within the aperture so that if for any reason a nut is unavailable for use with the bolt or becomes accidentally disengaged therefrom, or loosened with respect thereto, the bolt will still tend to remain engaged within the aperture.

BRIEF DESCRIPTION OF THE DRAWINGS

In the drawings:

FIG. 1 is a cross-sectional elevational view of one embodiment of the invention;

FIG. 2 is an enlarged fragmentary view of said embodiment of the invention;

FIG. 3 is an elevational view of a modified form of the invention;

FIG. 4 is an enlarged fragmentary view of said modified form of the invention in operative engagement with the surface of an aperture provided in a support member;

Throughout the various views similar numerals are employed to refer to similar parts of the invention.

DESCRIPTION OF THE PREFERRED EMBODIMENT

Figure 5:
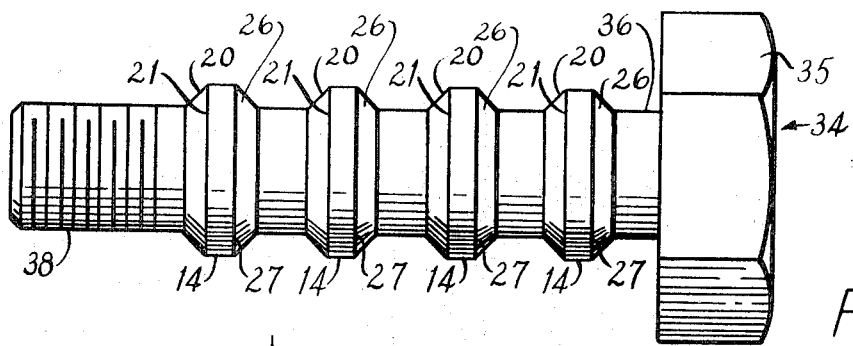
FIG. 5 is an elevational view of another modified form of the invention.

As shown in FIGS. 1 and 2 of the accompanying drawings, one embodiment of the present invention comprises a cylindrical stud, generally designated by the numeral 10, and a member, such as a plate 11, which is composed of a metal or other substance of similar characteristics. It is to be understood that the plate 11 may be part of a housing, frame or other structure wherein a stud may be employed. The plate 11 is provided with an aperture 12 which accommodates the stud 10 when it is press fitted into the aperture 12 in the conventional manner, the stud 10 being urged into the aperture 12 in the direction of the arrow designated by the numeral 13.

The stud 10 has a forward end 10a and a rearward end 10b and is provided with a plurality of annular lands 14 which are substantially parallel to and frictionally engageable with the surface 15 of the aperture 12. The stud 10 includes a solid cylindrical shaft 16 having a diameter which is less than the diameter of the aperture 12, thereby defining a spaced region 18 between the surface 19 of the shaft 16 and the surface 15 of the aperture 12. The annular lands 14 have a greater diameter than the shaft 16. The difference between the diameter of the lands 14 and of the shaft 16 may be in the order of as little as one or two thousandths of an inch or may be of a greater magnitude, as desired. Diameters of successive lands 14 may be constant, as shown, or if desired, may be varied.

As may be seen most clearly in FIG. 2, each of the annular lands 14 is intersected by an inclined annular surface 20, thereby forming a forward or leading edge 21 at the lower end of each of the lands 14. Each inclined annular surface 20 also intersects the shaft 16, as at 22.

The upper portion of each of the lands 14 is intersected by a shoulder 23 extending radially of the longitudinal axis of the stud 10 and forming a rearward or trailing edge 24.

To understand the operation of this form of the invention, it should be noted that the lands 14 have a diameter which exceeds that of the aperture 12 so that in order to dispose the stud 10 into the aperture 12 it is necessary to force the stud 10 thereinto, as by means of a press fit. In so doing, the surface 15 of the aperture 12 will be engaged by the lands 14 thereby subjecting said surface 15 to stress concentrations in the vicinity of the leading and trailing edges 21, 24 as well as in the vicinity of the surfaces of the lands 14 between said leading and trailing edges 21, 24. These stress concentrations urge the material of the plate 11 to flow into the region 18 between adjacent lands 14, thereby tending to relieve said stress concentrations. Thus, the surface 15 of the aperture 12 is frictionally engaged by the lands 14 and the foregoing flow of material of the plate 11 into the region 18 interferes with and minimizes axial and lateral displacement of the stud 10 with respect to the aperture 12 while at the same time involving a minimum of stress.

A modified form of the invention is depicted in FIGS. 3 and 4 where the stud 25 is provided with annular lands 14, inclined annular surfaces 20 and forward or leading edges 21, all as previously described in respect to the form of the invention depicted in FIGS. 1 and 2. However, in this modified form of the invention, an inclined annular surface 26 also intersects each of the lands 14 so as to form a rearward or trailing edge 27 at the upper end of each of the lands 14. With this arrangement, the stud 25 may be conveniently disposed into the aperture 12 either in the direction of the arrow 28 or the arrow 29. In this regard it will be observed that the inclined annular surfaces 20, 26 will aid in guiding the stud 25 into the aperture 12 and will permit accommodation of the stud 25 in the aperture 12 despite the fact that the latter may not be exactly aligned with the axis of the stud 25.

Figure 6:
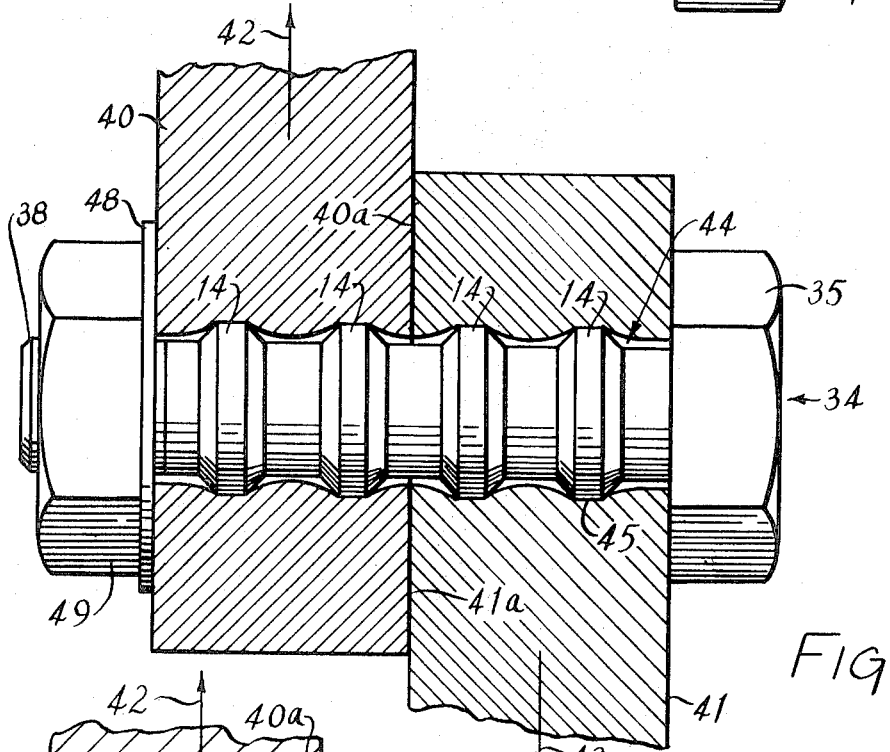
FIG. 6 is a cross-sectional view of this modified form of the invention in use as a bolt for fastening two plates.
Figure 7:
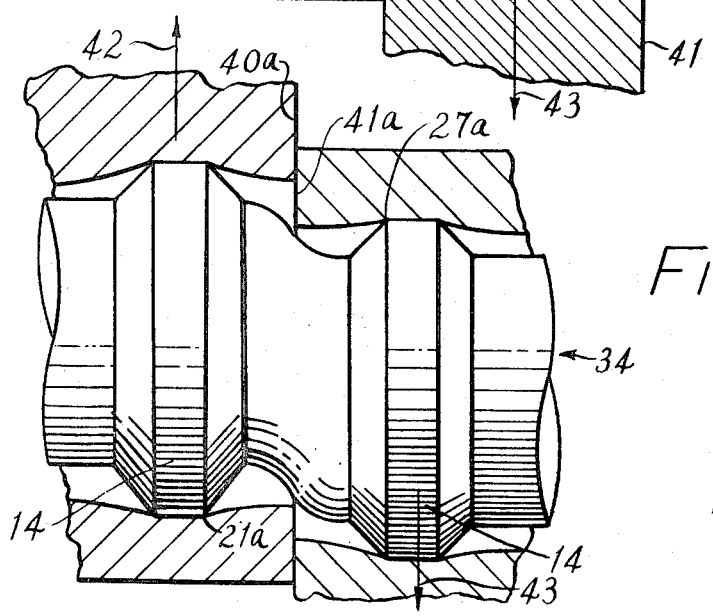
FIG. 7 is an enlarged fragmentary cross-sectional view of a portion of the bolt when the plates are subjected to opposing shear stresses directed transversely of the axis of the bolt.

Another modified form of the invention is depicted in FIGS. 5, 6 and 7. As may be seen in FIG. 5, this form of the invention comprises a bolt, generally designated by the numeral 34, having a head 35 of conventional form, a cylindrical shaft 36 formed integrally with said head 35 and provided with a threaded end portion 38, and a plurality of annular lands 14 similar to those described in respect to the form of the invention depicted in FIGS. 3 and 4. Thus, each of the annular lands 14 has inclined surfaces 20, 26, a forward or leading edge 21 and a rearward or trailing edge 27.

This form of the invention may be used to advantage in preventing excessive play and minimizing the likelihood of rupture where a plurality of members subject to vibration and stress are to be fastened together. This may be better appreciated by reference to FIG. 6 which depicts a pair of plates 40, 41 that are subject to opposing stresses in the directions of the arrows designated by the numerals 42, 43. These plates 40, 41 are provided with an aperture 44 which is adapted to receive the bolt 34, that is press fitted into said aperture 44 where the lands 14 thereof engage the surface 45 of the aperture 44 in the same manner as that described in respect to the engagement between the lands 14 of the previously described forms of the invention and the surface 15 of the aperture 12.

This engagement between the lands 14 and the aperture 44 interferes with and minimizes the possibility of play between the surface 45 of the aperture 44 and the lands 14. Thus, alignment of the plates 40, 41 and the disposition of the aperture 44 therein is maintained. So, also, vibratory movement of the plates 40, 41 which might otherwise be present, is minimized.

In addition, it will be observed that the engagement between the lands 14 and the surface 45 of the aperture 44 seals it against the entry of moisture and contaminants from outside the plates 41, 41. In this way, the possibility of corrosion within the aperture 44 is reduced or avoided. However, in the event that corrosion should occur between the lands 14 and the surface 45 of the aperture 44, so as to cause the bolt 34 to adhere to said surface 45, the bolt 34 can be removed in the usual manner in the course of which it will be necessary to overcome this adherence. Thus, unlike the situation which prevails in respect to a conventional bolt where adherence will be possible throughout the entire length of its shank and the aperture which accommodates it, the presently described form of the invention permits removal of the bolt 34 from the aperture 44 with relative ease.

The bolt 34 is provided with a washer 48 and nut 49 of conventional design, the nut 49 being threadedly engaged with the end portion 38, as depicted in FIG. 6. In this regard, it will be observed that the above-described engagement between the lands 14 and the aperture 44 tends to retain the bolt 34 within said aperture 44 even though the nut 49 may be accidentally loosened or disengaged from the end portion 38. Thus, since axial dislocation of the bolt 34 is resisted by the aforesaid engagement, the bolt 34 will tend to remain within the aperture 44 by virtue of such resistance.

An important feature of this form of the invention resides in the fact that the mating surfaces 40a, 41a of the plates 40, 41 are disposed intermediately of two adjacent lands 14, as depicted in FIGS. 6 and 7. This arrangement permits the bolt 34 to resist shear more effectively and results in a shear area which is disposed generally diagonally to the axis of the bolt 34 when it is in an unstressed condition, i.e., a profile of the shear area would tend to incline towards a line extending between the points 21a and 27a in FIG. 7. Thus, this shear area is greater than a conventional shear area directed perpendicularly to the axis of an unstressed conventional bolt. It will be observed that the opposing stresses in the direction of the arrows 42, 43 will subject the bolt 34 to a strain as depicted in FIG. 7, for example. In this position, the likelihood of shearing the bolt 34 is reduced because the energy which might otherwise be expended to accomplish shear is also devoted to the bending of the bolt 34.

It will also be seen that the bolt 34 is more resistant to fatigue rupture than conventional bolts because of its above-described ability to minimize vibration and play within the aperture and the greater shear area presented by said bolt 34.

It will also be observed that the foregoing features of the invention may be embodied in pins, rivets, fasteners and other longitudinally extending members.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. The combination comprising
   a. a pair of metal members having matable faces;
   b. said members having aligned apertures extend there through;
   c. a solid metal shaft provided with a forward and a rearward end;
   d. said shaft extending through said apertures for holding said matable faces in face to face contact;
   e. a plurality of transverse annular lands;
   f. said matable faces being disposed intermediately of two adjacent lands;
   g. each of said annular lands having forward and rearward ends;
   h. said annular lands including aligned outer surfaces being generally cylindrical and extending along the length of said shaft between said forward and rearward ends and parallel to the central axis of said shaft;
   i. said annular lands having a greater diameter than said apertures and being press fitted therein with said outer surfaces engaging the internal surfaces of said apertures whereby said members are subjected to stress;
   j. said stress inducing said metal to flow between said annular lands when they are pressed fitted into said aperture, thereby tending to relieve said stress;
   k. said material flow only partially filling the gap between said annular lands;
   l. an inclined annular surface intersecting the forward end of each of said annular lands and extending toward the forward end of said shaft and intersecting said shaft at a point spaced from the adjacent forward annular land, the surface of said shaft being cylindrical between the inclined annular surface and the adjacent forward annular land;
   m. said inclined annular surface being inclined sufficiently to cause the material flow to resist forward axial movement of said shaft relative to said members;
   n. the forward end of said shaft being threadedly engageable with a nut;
   o. the rearward end of said shaft being provided with a head.

* * * * *